June 18, 1929.  W. L. CALHOUN  1,717,835
FISHING MACHINE
Filed April 12, 1928  2 Sheets-Sheet 1
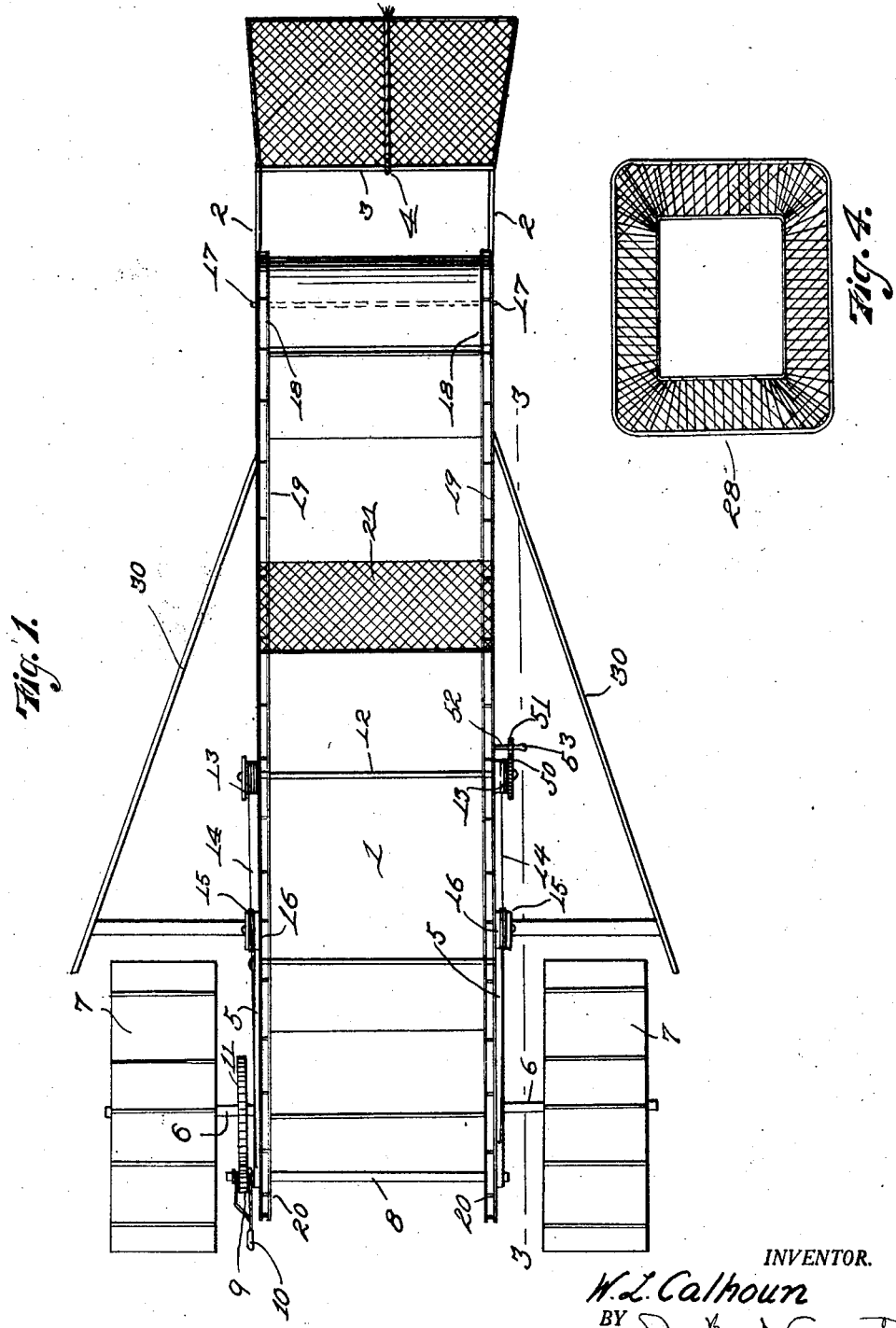
INVENTOR.
W. L. Calhoun
BY
ATTORNEY.

June 18, 1929.  W. L. CALHOUN  1,717,835
FISHING MACHINE
Filed April 12, 1928  2 Sheets-Sheet 2
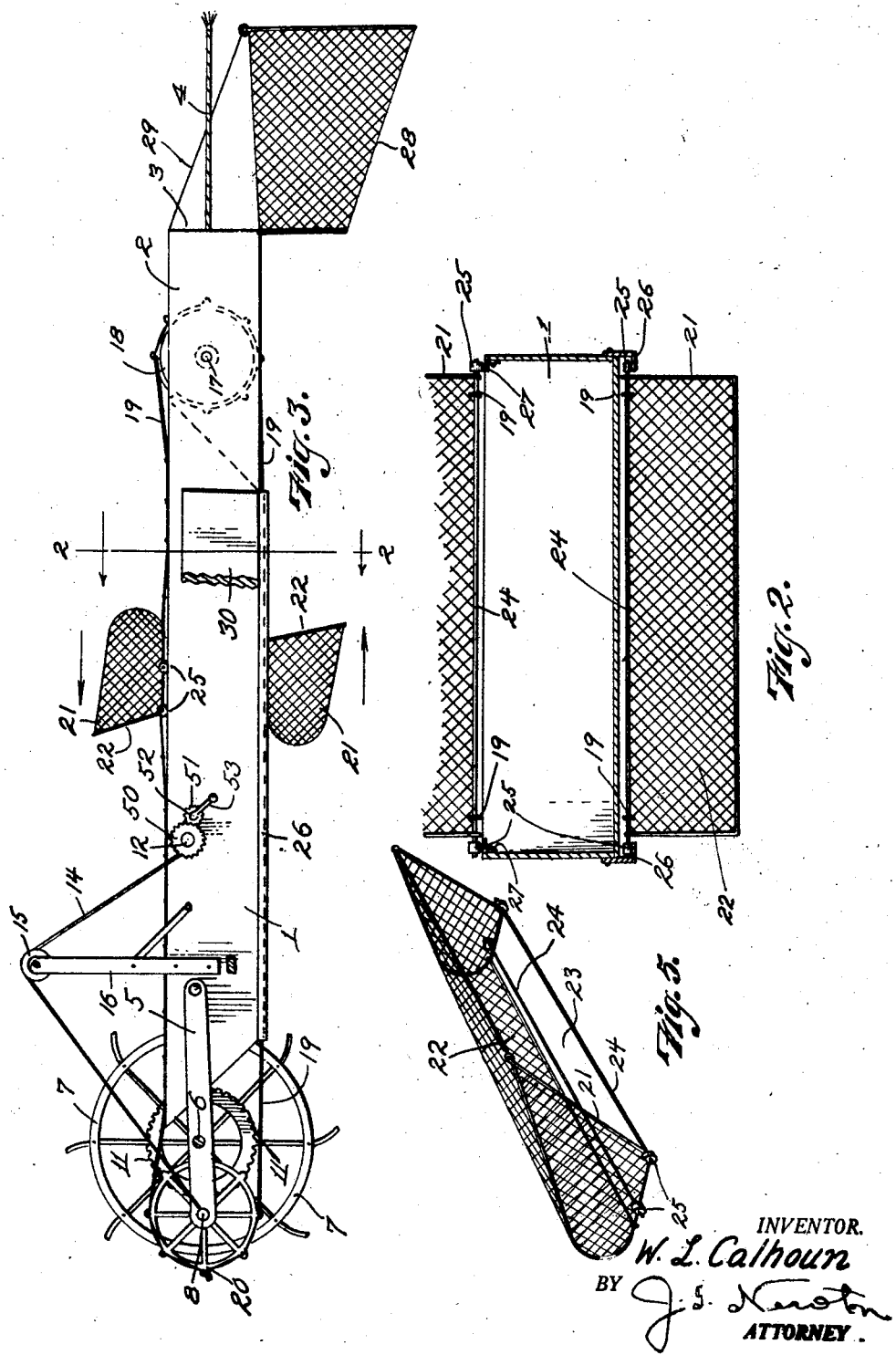
INVENTOR.
W. L. Calhoun
BY
ATTORNEY.

Patented June 18, 1929.

1,717,835

UNITED STATES PATENT OFFICE.

WASHINGTON L. CALHOUN, OF TARRYTOWN, GEORGIA.

FISHING MACHINE.

Application filed April 12, 1928. Serial No. 269,548.

This invention relates to improvements is fishing machines of that type in which a series of scoops are mounted to travel beneath a boat to catch any fish entering the path of travel of the scoops, the scoops being carried by endless conveyers driven by a motor depending for its power on the relative movement between the boat and water, the boat being either moored in moving water or towed through the water.

The invention has for its object the provision of a simplified means for driving the scoops and also the provision of mechanism for rendering the machine more efficient in its purpose.

The invention consists in the novel construction, combination and arrangement of parts, hereinafter described, pointed out in the appended claims and illustrated by the accompanying drawings.

In the accompanying drawings, in which similar reference characters designate corresponding parts, Figure 1 is a plan view of a fishing machine embodying the invention, Figure 2 is enlarged cross-section on the line 2—2 of Figure 3, Figure 3 is a view partly in longitudinal elevation and partly in section on the line 3—3 of Figure 1, Figure 4 is a detail view showing the forward end of the funnel for guiding the fish to the scoops, and Figure 5 is a detail perspective view of one of the scoops.

Referring to the drawings in detail, 1 designates a boat of the scow type, which, owing to its simple construction and shallow draft, is well adapted to the purpose of floating the fish-catching mechanism and for receiving the fish that are caught. The boat has an open hull, one without a deck. The sides of the boat are extended beyond the bow, as at 2, and secured to the forward ends of the extensions is the cross-piece 3, to the middle part of which is attached the rope 4 for mooring purposes so that the boat can swing to the movement of the flowing water.

At the stern of the boat, arms 5 are pivoted to one end to opposite sides of the boat so that the arms in a horizontal position project beyond the stern. Journaled in an intermediate part of these arms is the shaft 6 carrying at its ends the paddle-wheels 7 offset from the sides of the boat. Journaled in the extremities of the arms 5 is the shaft 8, on an end of which is splined a pinion 9 provided with a clutch member 10 for engaging the pinion with the larger gear 11 fixed on the shaft 6.

A windlass is provided for raising and lowering the paddle-wheels from and into the water. Journaled transversely of the boat in the sides thereof is the shaft 12 on which are mounted the drums 13. Fixed on an end of the shaft 12 is a gear 50 engaging the pinion 51 fixed on the stub-shaft 52 journaled in the side of the boat. By means of the crank-arm 53 on the stub-shaft, through the intervening mechanism, the windlass can be turned. Wound about the drums are ends of the ropes 14 passing over the pulleys 15 on the upper ends of the standards 16 secured to the sides of the boat. The ropes lead from the pulleys to the free ends of the arms 5 and are attached thereto. By operating the windlass the elevation of the arms can be regulated to drop the paddle-wheels into the water to be driven by the passing flow, or they can be raised clear of the water when their drive is no longer required. The drive of the paddle-wheel shaft 6 is transmitted through the meshed gears 9—11 to the shaft 8. To interrupt the drive to the shaft 8 without raising the paddle-wheels, the clutch member 10 can be actuated to disengage the pinion 9 from the gear 11.

At the bow of the boat a shaft 17 extends transversely of the extensions 2 and on this shaft are journaled the sprocket-wheels 18 over which are looped the forward bights of the sprocket chains 19, the rear bights of which are looped over the sprocket wheels 20 fixed on the shaft 8 carried by the arms 5. These sprocket chains extend around the boat from bow to stern on opposite sides thereof. The lower flight of each chain travels beneath the bottom of the boat in close proximity to edge of the bottom, and the upper flight travels in close proximity to the upper edge of the adjacent side of the boat.

Carried by the endless conveyer chains 19 are the scoops 21, each of which comprises a frame of metal rods and foraminous walls attached to the frame. The front end of the scoop is open to form a mouth, as at 22, and its back is partly open, as at 23. Each scoop is attached to the conveyer chains by rods 24, which form part of the scoop frame, passing through links of the chain, the ends of the rods on one side of the scoop extending through the same link so that the scoop can be carried around the sprocket wheels without deforming the frame of the scoop. Both of the rods 24 have journaled on their ends the rollers 25 to travel on tracks formed by the angle strips 26 attached to the sides of the boat and projecting beneath the longitudinal edges of the bottom of the boat. The rollers 25 also travel on the tracks formed by the angle strips 27 secured to the inner faces of the boat sides, forming tracks flush with the upper edges of the sides.

The tracks engaged by the rollers guide the scoops in the travel of the latter around the boat; particularly, the tracks 26 cause the scoops to travel closely to the bottom of the boat so that the openings 23 in the backs are closed as the scoops travel through the water.

Mounted in advance of the bow of the boat is a foraminous funnel 28 to guide approaching fish toward the path of travel of the scoops through the water beneath the bottom of the boat. This funnel is attached to the lower part of the cross-piece 3 and its front end is connected by the stays 29 to the upper part of the cross-piece so that the funnel is firmly held in place in front of the bow of the boat.

To protect the paddle-wheels from injury by drifting material, fenders 30 are mounted on the sides of the boat in advance of the paddle-wheels and extend slightly below the surface of the water. These fenders serve to shunt aside floating material that might strike the blades of the paddle-wheels.

In the operation of the fishing machine, the boat is moored so that it can swing to point its bow in the direction from which the water flows. The paddle-wheels having been lowered and the clutch member 10 having been adjusted to engage the gears 9 and 11, the flowing water impinging on the immersed blades thru the paddle-wheels and thru the intervening mechanism the conveyer chains 19 are driven. As the chains travel around the boat they carry the scoops 21 beneath the boat from stern to bow with the mouths of the scoops open in a forward direction to admit any fish that may be swimming in their path of travel.

In this travel of the scoops the openings 23 in their backs are closed by the bottom of the boat so that any fish that are caught cannot escape therethrough. The funnel 28 mounted in front of the bow serves to guide the fish entering the same toward the mouth of the approaching scoop. As a scoop moves forward, any fish caught therein move to the rear or pouch part of the scoop. As the movement of the scoop through the water is somewhat rapid, the flow of the water through the scoop serves to hold the caught fish in the scoop. As the scoop turns on the forward sprocket wheels 18, its back becomes lowermost and the caught fish are discharged through the opening 23 into the boat. Before the scoop reaches the end of its return trip over the boat, all of the caught fish in their endeavors to escape will wriggle through the opening. As the space between the returning scoop and the bottom of the boat is short, the fall will not injure the fish. When it is desired to cease operations, the gears 9 and 11 can be separated by the clutch member 10 and by means of the windlass the paddle-wheels can be raised clear of the water. While the machine is particularly designed to be moored to a stationary object in moving waters, yet it is obvious that the boat can be towed to provide the relative movement between the boat and water to operate the machine.

What I claim is:

1. In a fishing machine, the combination with a boat having an open hull, of parallel endless conveyors extending fore and aft of the boat on opposite sides thereof and passing beneath the bottom of the boat and over the open hull, means for driving the conveyers to travel forward beneath the bottom of the boat and rearward over the hull, and a plurality of scoops carried by the conveyers, said scoops having mouths to open forward as the scoops travel forward beneath the boat bottom, said scoops having discharge openings in their backs to be closed by the boat bottom during the forward travel of the scoops, and said scoops being reversed in their rearward travel to discharge through their back openings into the hull.

2. In a fishing machine, the combination with a boat having an open hull, of parallel endless conveyers extending fore and aft of the boat on opposite sides thereof and passing beneath the bottom of the boat and over the open hull, a support hinged to one end of the boat, a paddle-wheel motor mounted on the support and in driving engagement with the adjacent bight of the endless conveyers, means for raising and lowering the support to position the motor with relation to the water, and a plurality of scoops carried by the conveyers, said scoops having mouths to open forward as the scoops travel forward beneath the boat bottom, said scoops having discharge openings in their backs to be closed by the boat bottom during the forward travel of the scoops, and said scoops being reversed in their rearward travel to discharge through their back openings into the hull.

3. In a fishing machine, the combination of a boat having an open hull, of parallel endless conveyer chains extending fore and aft of the boat adjacent to the sides thereof and passing beneath the bottom of the boat and over the open hull, means for driving the conveyer chains to travel forward beneath the bottom and rearward over the open hull, a plurality of scoops carried by the conveyer chains, said scoops having mouths to open forward as the scoops travel forward beneath the boat bottom, said scoops having open backs to be closed by the boat bottom as the scoops ride along the same, and said scoops being reversed in their rearward travel to discharge through the openings in their backs into the hull driving the rearward travel of the scoops, rollers mounted on the sides of the scoops, and tracks on the boat to engage the rollers to guide the scoops during their travel along the boat.

4. In a fishing machine, the combination with a boat having an open hull, of parallel endless conveyers extending fore and aft of the boat, out-board means positioned at the bow and stern of the boat engaging the end bights of the endless conveyers to maintain the lower flights thereof beneath the bottom of the boat and the upper flights above the open hull, means for driving the conveyers so that the lower flights travel forward and the upper flights rearward, and a plurality of scoops carried by the conveyers in transverse relation to the hull, said scoops having mouths to open forward as the scoops travel forward beneath the boat bottom and said scoops being reversed in their rearward travel over the open hull to discharge into the same.

5. In a fishing machine, the combination with a boat having an open hull, of parallel endless conveyers extending fore and aft of the boat, out-board means positioned at the bow and stern of the boat engaging the end bights of the endless conveyers to maintain the lower flights thereof beneath the bottom of the boat and the upper flights above the open hull, one of said out-board means including a support hinged to the boat for vertical adjustment, means for adjusting said support, a paddle-wheel motor mounted on the hinged support to be lowered into and raised from the water, said motor having a driving connection with the adjacent bights of the conveyers to drive the lower flights of the conveyers forward, and a plurality of scoops carried by the conveyers in transverse relation to the hull, said scoops having mouths to open forward as the scoops travel forward beneath the boat bottom and said scoops being reversed in their rearward travel over the open hull to discharge into the same.

In testimony whereof I hereunto affix my signature.

WASHINGTON L. CALHOUN.